INVENTOR.
DONALD G. STENMARK,
BY
ATTORNEY.

United States Patent Office 3,701,813
Patented Oct. 31, 1972

3,701,813
PRODUCTION OF AROMATICS
Donald G. Stenmark, Houston, Tex., assignor to Esso Research and Engineering Company
Filed Nov. 12, 1970, Ser. No. 88,786
Int. Cl. C07c 5/28, 3/62
U.S. Cl. 260—668 A  14 Claims

ABSTRACT OF THE DISCLOSURE

In the liquid phase isomerization of a selected monocyclic aromatic hydrocarbon, such as a xylene to p-xylene, the production of the selected aromatic hydrocarbon is enhanced and the amount of recycled unisomerized hydrocarbon is reduced by transalkylation of the isomerizate prior to recycle of the transalkylate and separation of it into its component fractions.

BACKGROUND OF THE INVENTION

(1) Field of the invention

The present invention is directed to production of selected mono-cyclic aromatic hydrocarbons from isomers thereof and transalkylated products of said isomers. More particularly the invention is concerned with a combination of steps involving selected isomerization and transalkylation conditions in the presence of selected catalysts. In its more specific aspects the invention involves separation of the selected aromatic hydrocarbon and isomerization of the unisomerized hydrocarbons followed by transalkylation.

The invention also involves transalkylation of a selected aromatic hydrocarbon under specific transalkylation conditions to produce more of the selected aromatic hydrocarbon.

(2) The prior art

It is well known to isomerize polymethylbenzenes such as xylenes and the like in the presence of molybdenum oxide on silicon oxide-aluminum oxide catalysts in the presence of hydrogen or hydrogen and nitrogen. It is also known to prepare such catalysts which selectively produce high yields of a selected polymethylbenzene or mono-cyclic aromatic hydrocarbon.

It is also old in the art to prepare ternary addition compounds of aromatics, hydrogen halide, and aluminum halide (where the halide is chloride or bromide) and to use the same in separation of aromatic hydrocarbons from mixtures with other hydrocarbons. It is also old to isomerize methylbenzenes in the presence of ternary addition compounds and to separate aromatic hydrocarbons with ternary addition compounds.

None of the art, however, teaches or makes obvious the present invention where a combination of steps is employed to enhance production of a selected mono-cyclic aromatic hydrocarbon or polymethylbenzene where production of the selected hydrocarbon is enhanced and the recycle stream is substantially reduced.

Specific prior art considered in connection with this invention include the following listed U.S. patents:

3,374,257    3,449,456
3,374,279    3,467,725
3,409,687    3,484,385
3,410,919 plus the art cited by the inventors in the foregoing several listed patents plus that cited by the Patent Office against the listed patents.

SUMMARY OF THE INVENTION

The present invention may be briefly described and summarized as involving the production of mono-cyclic aromatic hydrocarbons. More particularly, the invention is concerned with the production of polymethylbenzene in which a combination of isomerization, transalkylation, and separation steps are employed with the optional step of dealkylation. In its more specific aspects, the invention is concerned with the production of p-xylene from $C_8$ hydrocarbons, $C_8$ aromatic hydrocarbons such as polymethylbenzene and particularly the xylenes wherein the ethylbenzene is destroyed or reduced in quantity.

Isomerization conditions and feeds

In the practice of the present invention, a shaped silica-alumina molybdenum-containing catalyst is exposed to a pressure of at least 100 p.s.i.g. followed by heating said catalyst in the presence of hydrogen at said pressure to a temperature within the range from about 650° to no greater than 850° F. and maintaining said temperature in the presence of hydrogen for at least 16 hours. The heated catalyst is then contacted with a polymethyl benzene having from 2 to 4 methyl groups at an isomerization temperature within the range from about 500° to about 850° F. under isomerization conditions in the presence of hydrogen and nitrogen to form a selected isomer.

Isomerization conditions include a pressure within the range from about 100 to about 700 p.s.i.g., a feed rate of from about 0.1 to about 10 liquid v./v./hour, and a hydrogen to polymethylbenzene mole ratio within the range from about 2:1 to about 20:1, the isomerization temperature being selected to provide the lowest temperature within said range of isomerization temperatures consistent with production of a selected level of the selected isomer as determined by the relationship:

$$K_x = \frac{\text{Percent selected isomer}}{\text{Percent selected isomer} + \text{sum of the percent of other isomers}}$$

with the limit of $K_x$ being the thermodynamic equilibrium value of the selected isomer at said selected lowest temperature.

The amount of nitrogen employed should be sufficient to provide an amount in the gas phase within the range from about 0.1 to about 4 mole percent. Stated another way, the amount of nitrogen in the recycle gas should be maintained at a level no greater than within the range from about 0.1 to about 4% by volume.

The polymethylbenzene which is employed as a feed to the present invention is a polymethylbenzene having from 2 to 4 methyl groups on the benzene ring and includes orthoxylene, metaxylene, and paraxylene, 1,2,4-trimethylbenzene, 1,3,5 - trimethylbenzene, 1,2,3-trimethylbenzene, and the tetramethylbenzenes including 1,2,4,5-tetramethylbenzene, 1,2,3,5-tetramehylbenzene and 1,2,3,4-tetramethylbenzene.

A catalyst employed in the present invention is the catalyst described and claimed in the Amir patent U.S. 3,484,385. This catalyst is preferably produced by subjecting shapes of silica-alumina containing from about 10% to about 50% by weight of alumina and about 50% to about 90% of silica and containing from about 3% to about 10% by weight molybdenum as $MoO_3$ on a dry basis to drying at a temperature below 650° F. for a time within the range from about one to about five hours. The shapes may preferably be heated to a temperature below about 950° F. before the shapes are impregnated with molybdenum as described in the Amir application supra.

In the method of the present invention, the catalyst must be activated by hydrogen treatment at a pressure of at least 100 p.s.i.g. and a temperature in the range from about 650° to no greater than 850° F. at said pressure and temperature for at least 16 hours. The catalyst must not be exposed to temperatures in excess of 250° in the presence of air or hydrogen at pressure below 100 p.s.i.g. The pressures at which the catalyst is heated and maintained at these temperatures may range from 100 to 1,000 p.s.i.g. The times employed may range from 16 hours up to 100 hours although the heating times may be greater than 100 hours if desired.

Transalkylation conditions and feeds

The feeds to the transalkylation of the present invention may be any mono-cyclic aromatic hydrocarbon and/or polymethylbenzene such as $C_6$ to $C_{10}$ aromatic hydrocarbons as illustrated by benzene, toluene, ethylbenzene, para-, meta-, and ortho-xylenes, diethylbenzene, the trimethylbenzenes such as pseudo-cumene and mesitylene, the tetramethylenebenzenes such as isodurene and durene, and the like.

The conditions include temperatures from about 100° to about 250° F. in the liquid phase.

A complex of the $C_6$ to $C_{10}$ mono-cyclic aromatic hydrocarbon, aluminum halide, and hydrogen halide is used as the liquid catalyst which possesses a limited miscibility with $C_6$ and $C_{10}$ aromatic, thus permitting a two-liquid phase process. The heavy complex phase has a composition as follows:

[Aromatic $\cdot HX \cdot Al_2X_6$] plus dissolved
$C_6$–$C_{10}$ from 4 to 7 moles where
$X = Cl$ or $Br$ A suitable aromatic hydrocarbon ligand is mesitylene, and aluminum chloride and hydrogen chloride, for example, aer used in making up the transalkylation catalyst. This may be accomplished by mixing the required amounts of the components under the following conditions:

50° F.
60 minutes mixing time.

pseudocumene or any aromatic of sufficient ring basicity, or mixture thereof, may be used in place of mesitylene to prepare the complex. Alkyl or phenyl substituted benzenes are suitable but chloro- and nitrobenzenes are not. During catalyst preparation, the mole of aromatic which is complexed as Aromatic·$HX \cdot Al_2X_6$, i.e., the aromatic ligand, will isomerize and slightly disproportionate to aromatic species which will provide a more stable complex. Alkyl groups in the meta position on the aromatic ring provided greater ring basicity and hence greater complex stability. Thus, pseudocumene, if used to prepare the complex, will isomerize to mesitylene but will require a longer preparation time of 24 hours. In the recycle transalkylation process, the original aromatic ligand will be exchanged for other aromatics that form a more stable, or stronger, complex. For example, aromatics such as isodurene, pentamethylbenzene, or hexamethylbenzene form a stronger complex than mesitylene and would in part replace mesitylene if they were present int he system. At steady state, when $C_{11}$ or higher aromatics are not present in recycle feed streams, the aromatic ligand will be a mixture of $C_6$–$C_{10}$ aromatics, primarily $C_9$–$C_{10}$, and in addition $C_6$–$C_{10}$ will also be present as dissolved aromatics consistent with miscibility limits in the complex phase.

For operation of the transalkylation reaction temperatures within the range of about 100° to about 250° F. are used in the liquid phase. The feed —LHSV (hourly volumetric feed rate/complex phase holdup volume) should be from about 0.1 to about 10.0. The complex used as the catalyst is employed at a rate of from about 0.1 to about 25.0 complex—LHSV (hourly volumetric complex rate/complex phase holdup volume). The complex phase holdup time should be from about 1 to about 120 minutes. The hydrocarbon saturated, complex phase is mixed with transalkylation feed at the desired temperature for the desired time, after which, the two liquid phase mixture is allowed to settle. The upper phase is the transalkylation product, and the lower, complex phase is recycled as catalyst.

Dealkylation conditions and feeds

The dealkylation conditions may be conducted suitably in the presence of dealkylation catalyst, among which many are well known; for example, silica-alumina or metal containing zeolites employed at a temperature from about 850° to about 1250° F. and at a pressure from about 500 to about 800 p.s.i.g. in the gas phase may be used. Another dealkylation technique is the noncatalytic, thermal process employed at a temperature from about 1100° to 1400° F. and at a pressure from 500–1000 p.s.i.g. which is given by way of illustration and not by way of limitation.

The feed stocks to the dealkylation step are the $C_9$ and $C_{10}$ mono-cyclic hydrocarbons of polymethylbenzenes which are separated from the $C_8$ mono-cyclic hydrocarbon or polymethylbenzene by distillation. The $C_8$ mono-cyclic hydrocarbons include the xylenes, paraxylene, orthoxylene, metaxylene, and ethylbenzene. Separated from the $C_8$ hydrocarbons are $C_9$ and $C_{10}$ hydrocarbons which may include the diethylbenzenes and tetramethylbenzenes such as durene, isodurene, prehnitene and the like. A mixture of these hydrocarbons is subjected to the dealkylation step from which is recovered a $C_6$ to $C_{10}$ mono-cyclic aromatic hydrocarbon; the disposition of which will be described further.

BRIEF DESCRIPTION OF THE DRAWING

The present invention will be further illustrated by reference to the drawing in which.

DESCRIPTION OF THE PREFERRED MODE AND EMBODIMENT WITH RESPECT TO THE DRAWING

Figure 1:
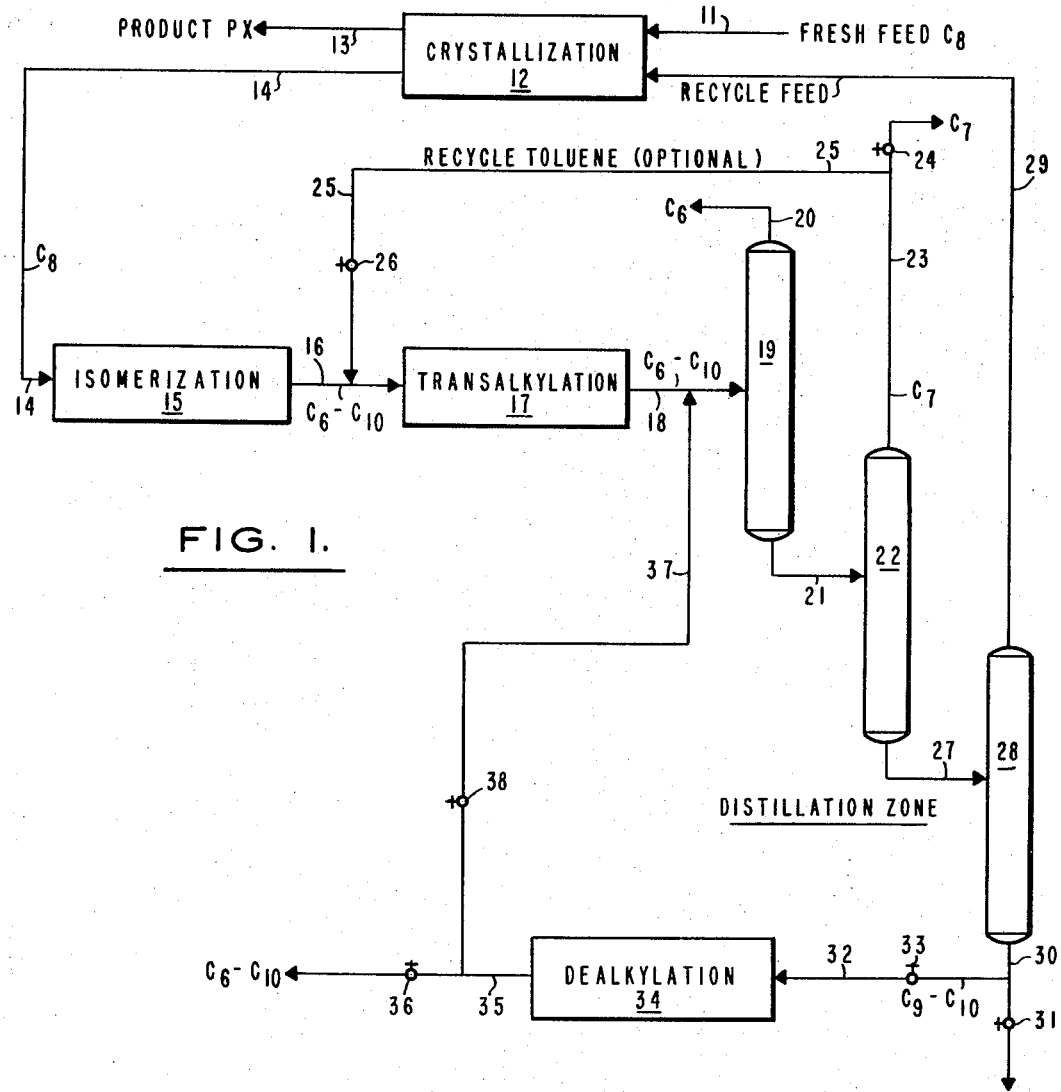
FIG. 1 is a flow diagram of a preferred mode of the invention.

Before describing the drawing in specific detail, the following definitions are presented:

In a paraxylene production circuit, the production performance of a given fresh feed stock is measured by the following dependent variables, upon which the process economics are based:

(1) the paraxylene produced per volume of fresh feed and (2) the magnitude of the recycle stream in the isomerization loop.

In the absence of $C_8$-purge streams, the following independent variables influence the above performance variables and are characteristic of the isomerizer:

(a) the $K_X$ versus the xylenes reduction (XYR) and
(b) the reduction ratio (RR).

where:

$K_X$ = paraxylene in the isomerized $$xylenes = PX/(PX+OX+MX)$$

PX, OX, MX = paraxylene, orthoxylene, and metaxylene, respectively.
XYR = (feed xylenes-product xylenes)/feed xylenes, across Isomerizer.
EBR = (feed EB-product EB)/feed EB across Isomerizer.
EB = ethylbenzene
RR = EBR/XYR In the present isomerization operation using the catalyst and conditions mentioned, the reduction ratio is approximately constant at RR$\simeq$1.7, and the xylenes losses are a function of the $K_X$ as described by the reaction phenomena.

Referring now to the drawing, and particularly to FIG. 1, numeral 11 designates a feed line by way of which a fresh feed including a mixture of xylenes and ethylbenzene are introduced into the system. Fresh feed may include para-, ortho-, and meta-xylenes as well as ethylbenzene. The fresh feed mixture is introduced into a separation zone 12 which in this particular case may be a crystallization operation such as described in the prior art; for example, the Wadley et al. patent U.S. 3,409,687, the Amir et al. patent U.S. 3,410,919, and the Amir et al. patent U.S. 3,449,456. A product stream of p-xylene is removed by line 13 for use as is well known in the art for p-xylene while a filtrate fraction 14 is recycled. While zone 12 is shown as a crystallization zone, it is to be understood that zone 12 may be any separation zone by way of which p-xylene or other selected aromatics or polymethylbenzene may be separated.

The filtrate fraction is then introduced by line 14 into an isomerization zone 15 which may be an isomerization zone as described in the Wadley et al. patent U.S. 3,409,687, the Amir et al. patent U.S. 3,410,919, and the Amir et al. patent U.S. 3,449,456.

The isomerate obtained from isomerization zone 15 is discharged by line 16 and comprises $C_6$ to $C_{10}$ polymethylbenzenes or mono-cyclic hydrocarbons which are introduced thereby to transalkylation zone 17 where the $C_6$ to $C_{10}$ aromatic hydrocarbons are transalkylated to form $C_6$ to $C_{10}$ aromatic hydrocarbons in accordance with the following description: the transalkylation step of the present invention under the conditions set out herein is a liquid phase reaction system which destroys ethylbenzene by way of a mechanism of the ethyl-group transfer onto a toluene, xylene, or an ethylbenzene molecule. The qualitative reaction behavior is presented in the following table, and the occurrence of the significant reactions in the respective isomerization and transalkylation zones is specified by an affirmative or negative as shown below:

| Reactions | Isomerization zone | Transalkylation zone |
|---|---|---|
| Isomerization: 1.  | Yes | No |
| Hydrogenation: 2. $H_2$ and XY and EB→Benzene, toluene, Nonaromatics. | Yes | No |
| Disproportionation: | | |
| 3. XY+XY──→TRIM+Toluene | Yes | No |
| 4. EB+EB──→DE+benzene | Yes | Yes |
| Transalkylation: | | |
| 5. EB+DY──→ME+toluene | Yes | No |
| 6. EB+XY──→DME+benzene | Yes | Yes |
| 7. EB+toluene──→ME+benzene | Yes | Yes |

Where: XY=xylenes, TRIM=trimethylbenzenes, ME=methylethylbenzenes, DME=dimethylethylbenzenes, DE=diethylbenzenes.

Figure 4:
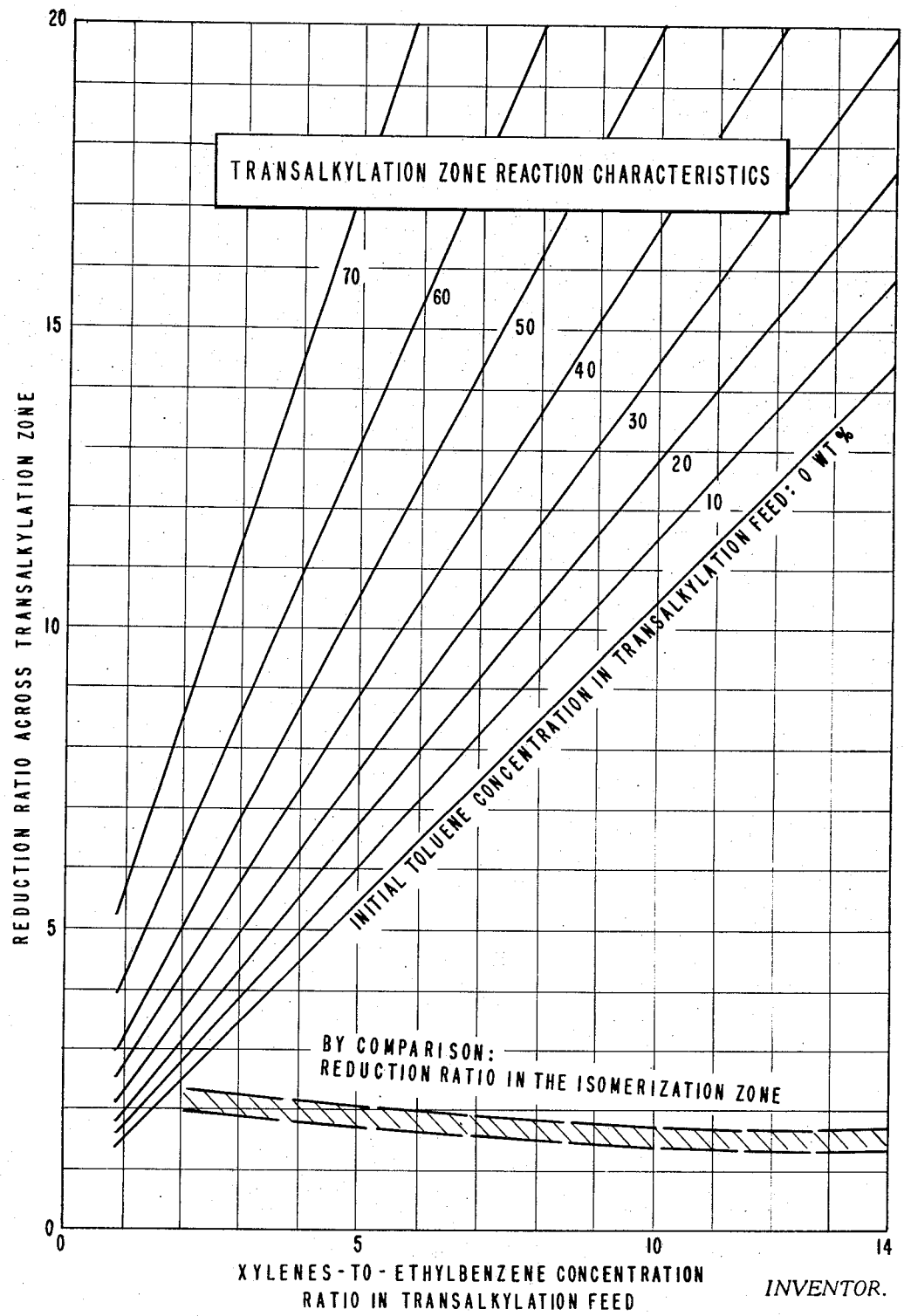
FIG. 4 is a plot of data of the transalkylation reaction characteristics.

Thus, the relatively low reduction ratio in isomerization is primarily attributed to reaction 3 above. With the absence of this reaction in the transalkylation zone very high reduction ratios (RR) are possible. As shown in FIG. 4, the reduction ratio is a function of the recycle feed content of toluene, ethylbenzene and xylenes. The ethylbenzene and xylene in the transalkylation feed are a function of their disappearance in the recycle loop (purge streams, fractionation, and loss by reaction); and toluene, normally not present in high concentrations, may be recovered from the isomerization zone (reactions 2, 3 and 5 above) and recycled to the transalkylation zone to enhance the overall RR across the recycle loop.

Transalkylation on this basis provides high reduction ratios and flexibility of the transalkylation, that is the effect of a combination process of transalkylation and isomerization is possible, which heretofore was unobvious.

The product from transalkylation zone 17 is withdrawn by line 18 and discharged into a distillation zone 19 provided with all suitable auxiliary equipment not shown for separation of a $C_6$ aromatic fraction by line 20 which is recovered, and a $C_7$ to $C_{10}$ fraction by line 21 which is routed into distillation zone 22 where toluene is withdrawn by line 23 and recovered by opening valve 24 or with valve 24 closed by recycling by branch 25 controlled by a valve 26 into zone 17. The $C_8$ to $C_{10}$ aromatic hydrocarbons discharged from distillation zone 22, which incidentally is similarly equipped to zone 19, by line 27 through distillation zone 28, which is equipped similarly to zones 19 and 22, where a recycle feed comprising $C_8$ hydrocarbons is withdrawn by line 29 and introduced thereby into zone 12 for separation of p-xylene by crystallization or other means depending on the type of separation zone employed.

The heavier polymethylbenzenes including $C_9$ to $C_{10}$ aromatic hydrocarbons are withdrawn from zone 28 by line 30 and may be discharged from the system by opening valve 31. Preferably, however, the $C_9$ to $C_{10}$ fraction is withdrawn by branch line 32 controlled by valve 33 into a dealkylation zone 34 where the $C_9$ to $C_{10}$ polymethylbenzenes are dealkylated to form $C_6$ to $C_{10}$ monocyclic aromatic hydrocarbons which may be discharged by line 35, but preferably are recycled by line 37 controlled by valve 38 to zone 19, valve 36 being closed.

It will be seen by reference to FIG. 1 and the foregoing discussion that a simple process has been devised wherein ethylbenzene is destroyed and paraxylene is maximized with the amount of recycle stream being minimized.

Figure 2:
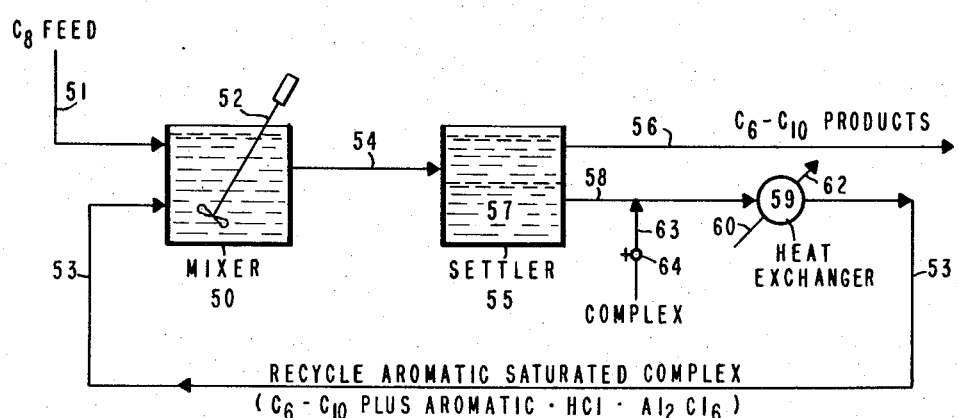
FIG. 2 is a flow diagram of the transalkylation step.
Figure 3:
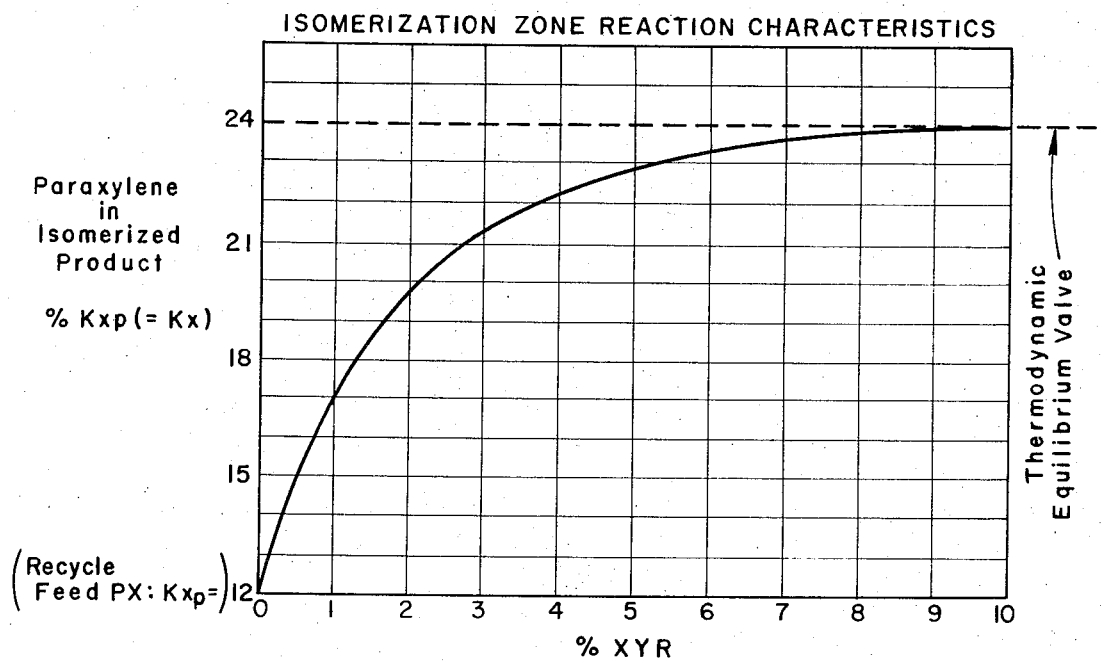
FIG. 3 is a plot of data of the isomerization reaction characteristics.

In FIG. 2 the transalkylation step is quite simple and may be employed as follows:

A $C_8$ aromatic hydrocarbon feed such as described herein may be introduced into the vessel 50 by line 51 and admixed by mixing device 52 with a recycle, aromatic saturated, liquid complex introduced by line 53. The two liquid phase mixture is then discharged from vessel 50 by line 54 to a settling vessel 55 where a separation is made between the $C_6$ to $C_{10}$ polymethylbenzene products which are withdrawn by line 56, and the complex which is indicated by the numeral 57 is withdrawn by line 58; its temperature is adjusted in heat exchanger 59 into which steam is introduced by line 60 and withdrawn by line 62. Makeup complex may be introduced by line 63 controlled by valve 64.

In order to illustrate the present invention further with respect to a particular feed stock of the $C_8$ aromatic hydrocarbon the results of the xylene isomerization process "alone" as described in the prior art is compared to results by the present invention. This will be shown in the following table:

| (1) | Xylenes isomerization— "Alone" [2] | Present invention combination process [3] | |
|---|---|---|---|
| | | Zero [4] | 32% [4] |
| Isomerization reactor severity: | | | |
| Percent Kx | 23.0 | 19.2 | 22.0 |
| Percent XYR | 6.0 | 1.7 | 4.0 |
| RR | 1.7 | 1.7 | 1.7 |
| Transalkylation severity: | | | |
| Percent XYR (Feed, Product) | | 4.1 | 3.1 |
| RR (Feed, Product) | | 8.8 | 9.7 |
| Overall severity: | | | |
| Percent XYR | 6.0 | 5.7 | 7.0 |
| RR | 1.7 | 6.6 | 5.0 |
| Steady-state material balance (wt.): | | | |
| Paraxylene Produced | 54.6 | 54.7 | 55.4 |
| Crystallizer feed: | | | |
| Percent XY | 70.9 | 90.4 | 87.7 |
| Percent EB | 29.1 | 9.6 | 12.3 |
| Total $C_8$ aromatics | 673.3 | 552.4 | 464.0 |
| Filtrate: | | | |
| Percent XY | 68.3 | 89.3 | 86.0 |
| Percent EB | 31.7 | 10.7 | 14.0 |
| Total $C_8$ aromatics | 618.7 | 497.8 | 408.6 |
| Isomerate: | | | |
| Percent XY | 69.3 | 89.4 | 86.4 |
| Percent EB | 30.7 | 10.6 | 13.6 |
| Total $C_8$ aromatics | 573.3 | 488.7 | 390.6 |
| Transalkylate: | | | |
| Percent XY | | 92.7 | 89.8 |
| Percent EB | | 7.3 | 10.2 |
| Total $C_8$ aromatics | | 452.4 | 364.0 |

[1] See the following table:

| Fresh feed (basis): | Percent |
|---|---|
| Percent EB | 20 |
| Percent PX | 19 |
| Percent MX | 42 |
| Percent OX | 19 |
| Total weight | 100 |

[2] Reference case.
[3] Percent toluene in recycle feed to transalkylation unit.
[4] Illustrates reduced recycle rate at a constant PX production.

It is noteworthy from considering the table that with the amount of p-xylene product being substantially constant the amount of crystallizer feed has been substantially reduced. This also applies to the amount of filtrate and the percentage of xylenes and ethylbenzene in the isomerate. Thus the present invention is quite useful and unobvious.

The nature and objects of the present invention having been completely described and illustrated and the best mode contemplated set forth what I wish to claim as new and useful and secure by Letters Patent is:

1. A method of producing a selected monocyclic methylated aromatic hydrocarbon from monocyclic aromatic hydrocarbons of the same or higher molecular weight which comprises:
    separating a feed mixture of ortho, meta, para xylenes and ethylbenzene to obtain a purified paraxylene fraction and a first mixture of the other xylenes and ethylbenzenes;
    separately recovering said paraxylene fraction and said first mixture;
    subjecting said first mixture to isomerization conditions to form a second mixture of $C_6$ to $C_{10}$ mono-cyclic aromatic hydrocarbons;
    subjecting said second mixture to transalkylation conditions in the presence of a $C_6$ to $C_{10}$ mono-cyclic aromatic hydrocarbon-aluminum halide-hydrogen halide complex, where said halide is bromide or chloride, under conditions to transalkylate said $C_6$ to $C_{10}$ monocyclic aromatic hydrocarbons and form p-xylene;
    separating said transalkylated aromatic hydrocarbons into separate $C_6$, $C_7$, $C_8$ including p-xylene, and heavier monocyclic aromatic hydrocarbon fractions;
    separately recovering said last named fractions; and
    recycling the separated transalkylated $C_8$ aromatic hydrocarbons to said first separating steps;
    whereby the production of p-xylene is enhanced and the recycled stream is substantially reduced.

2. A method in accordance with claim 1 in which the first separation step is by low temperature crystallization.

3. A method in accordance with claim 1 in which the isomerization conditions include:
    (a) a molybdena on silica-alumina catalyst;
    (b) a temperature within the range of about 500° F. to about 850° F.;
    (c) gas phase;
    (d) a liquid hourly space velocity within the range of 0.1 v./v./hour to 10 v./v./hour.

4. A method in accordance with claim 1 in which the transalkylation conditions include:
    (a) temperature within the range of about 100° F. to about 250° F.;
    (b) liquid phase;
    (c) 0.1–10.0 feed, LHSV (hourly volumetric feed rate/ complex phase holdup volume);
    (d) 0.1–25.0 complex-LHSV (hourly volumetric complex rate/complex phase holdup volume); and
    (e) about 1 to about 120 minutes complex phase holdup time.

5. A method in accordance with claim 1 in which the $C_7$ aromatic hydrocarbon fraction contains toluene and is recycled to said transalkylation.

6. A method in accordance with claim 1 in which the $C_7$ aromatic hydrocarbon fraction is recovered.

7. A method in accordance with claim 1 in which the $C_8$ hydrocarbons separated from the transalkylated hydrocarbons are separated from heavier aromatic hydrocarbons including $C_9$ and $C_{10}$ aromatic hydrocarbons and in which said $C_9$ and $C_{10}$ aromatic hydrocarbons are dealkylated to $C_6$–$C_{10}$ aromatic hydrocarbons.

8. A method in accordance with claim 7 in which the $C_6$–$C_{10}$ aromatic hydrocarbons resulting from the dealkylation step are admixed with the $C_6$–$C_{10}$ aromatic hydrocarbons from the transalkylation step.

9. A method in accordance with claim 1 in which the $C_6$ to $C_{10}$ aromatic hydrocarbons in the complex are in part dissolved and in part complexed as Aromatic $\cdot HX \cdot Al_2X_6$ where X=Br or Cl.

10. A transalkylation method in which $C_8$ aromatic hydrocarbons are contacted with a $C_6$ to $C_{10}$ aromatic hydrocarbon complex of aluminum halide and hydrogen halide where said halide is chlorine or bromine under transalkylation conditions, a $C_6$ to $C_{10}$ aromatic hydrocarbon fraction separated from said complex and said complex recycled to transalkylate additional $C_8$ aromatic hydrocarbons.

11. A method in accordance with claim 10 in which the transalkylation conditions include:
    (a) temperature within the range of about 100° F. to about 250° F.;
    (b) liquid phase;
    (c) 0.1–10.0 feed, LHSV (hourly volumetric feed rate/ complex phase holdup volume);
    (d) 0.1–25.0 complex-LHSV (hourly volumetric complex rate/complex phase holdup volume); and
    (e) about 1 to about 120 minutes complex phase holdup time.

12. A method in accordance with claim 11 in which the transalkylated $C_6$ to $C_{10}$ aromatic hydrocarbon separated from the complex is separated into $C_6$, $C_7$, and $C_8$ aromatic hydrocarbons.

13. A method in accordance with claim 12 in which the $C_8$ aromatic hydrocarbons contain paraxylene which is separated and recovered from the remaining $C_8$ aromatic hydrocarbons.

14. A method in accordance with claim 13 in which the remaining $C_8$ aromatic hydrocarbons are isomerized to form a fraction rich in paraxylene which is separately recovered.

References Cited
UNITED STATES PATENTS

| | | | |
|---|---|---|---|
| 3,214,485 | 10/1965 | Burk et al. | 260—668 A |
| 2,756,261 | 7/1956 | Fetterly | 260—668 A |
| 3,177,264 | 4/1965 | Buchsbaum et al. | 260—668 A |
| 3,410,919 | 11/1968 | Amir et al. | 260—668 A |
| 3,449,456 | 6/1969 | Amir et al. | 260—668 A |
| 3,551,509 | 12/1970 | Thomas et al. | 260—672 T |

CURTIS R. DAVIS, Primary Examiner

U.S. Cl. X.R.

260—672 R, 672 T